US012063730B2

(12) United States Patent
Secretin et al.

(10) Patent No.: US 12,063,730 B2
(45) Date of Patent: Aug. 13, 2024

(54) METHOD AND SYSTEM FOR PERFORMING MANAGEMENT OF A LUMINAIRE NETWORK

(71) Applicant: SCHREDER S.A., Brussels (BE)

(72) Inventors: Laurent Secretin, Liège (BE); Michael Steurer, Liège (BE)

(73) Assignee: Schreder S.A., Brussels (BE)

( * ) Notice: Subject to any disclaimer, the term of this patent is extended or adjusted under 35 U.S.C. 154(b) by 0 days.

(21) Appl. No.: 18/002,359

(22) PCT Filed: Jun. 18, 2021

(86) PCT No.: PCT/EP2021/066694
§ 371 (c)(1),
(2) Date: Dec. 19, 2022

(87) PCT Pub. No.: WO2021/255278
PCT Pub. Date: Dec. 23, 2021

(65) Prior Publication Data
US 2023/0239984 A1 Jul. 27, 2023

(30) Foreign Application Priority Data
Jun. 18, 2020 (NL) .................................... 2025859

(51) Int. Cl.
*H05B 47/115* (2020.01)
*G01W 1/10* (2006.01)
*G08G 1/01* (2006.01)

(52) U.S. Cl.
CPC ............ *H05B 47/115* (2020.01); *G01W 1/10* (2013.01); *G08G 1/0129* (2013.01); *G08G 1/0137* (2013.01)

(58) Field of Classification Search
CPC ..... H05B 47/115; H05B 47/105; G01W 1/10; G08G 1/0129; G08G 1/0137; Y02B 20/40
See application file for complete search history.

(56) References Cited

U.S. PATENT DOCUMENTS

2010/0029268 A1* 2/2010 Myer ...................... F21V 29/83
340/521
2012/0323474 A1* 12/2012 Breed .................... G08G 1/161
701/117
(Continued)

FOREIGN PATENT DOCUMENTS

| EP | 2375872 A2 | 10/2011 |
| WO | 2012090142 A2 | 7/2012 |
| WO | 2018189744 A1 | 10/2018 |

OTHER PUBLICATIONS

PCT International Search Report and Written Opinion, Application No. PCT/EP2021/066694, mailed Aug. 16, 2021, 14 pages.
(Continued)

*Primary Examiner* — Tsion Tumebo
(74) *Attorney, Agent, or Firm* — McDonnell Boehnen Hulbert & Berghoff LLP

(57) ABSTRACT

Example embodiments relate to methods and systems for performing management of a luminaire network. One example embodiment includes a method of performing management in a luminaire network that includes a plurality of luminaires and a control system. Each luminaire of the plurality of luminaires is configured to operate in accordance with at least one profile which defines one or more settings of the luminaire in function of time. The method includes retrieving, by the control system, traffic data from at least one traffic database, preferably vehicle and/or pedestrian traffic data. The method also includes retrieving, by the control system, weather data. Additionally, the method includes predicting, by the control system, for each luminaire motion related conditions for a future period of time based on the retrieved traffic data and the retrieved weather data, preferably motion related conditions influencing the motion behavior of vehicles and/or pedestrians circulating in the vicinity.

18 Claims, 3 Drawing Sheets

(56) References Cited

U.S. PATENT DOCUMENTS

| | | | |
|---|---|---|---|
| 2014/0139116 A1* | 5/2014 | Reed | H05B 47/115 |
| | | | 315/153 |
| 2015/0035437 A1* | 2/2015 | Panopoulos | H05B 47/105 |
| | | | 315/291 |
| 2016/0124906 A1* | 5/2016 | Karpov | G06N 3/04 |
| | | | 703/2 |
| 2016/0286629 A1* | 9/2016 | Chen | H05B 47/19 |
| 2017/0171949 A1 | 6/2017 | Kim et al. | |
| 2020/0146132 A1 | 5/2020 | Chen et al. | |
| 2020/0170093 A1* | 5/2020 | Mirsky | F21S 8/085 |

OTHER PUBLICATIONS

Pletzer, Felix, Roland Tusch, Laszlo Böszörmenyi, and Bernhard Rinner. "Robust traffic state estimation on smart cameras." In 2012 IEEE Ninth International Conference on Advanced Video and Signal-Based Surveillance, pp. 434-439. IEEE, 2012.

De Paz, Juan F., Javier Bajo, Sara Rodríguez, Gabriel Villarrubia, and Juan M. Corchado. "Intelligent system for lighting control in smart cities." Information Sciences 372 (2016): 241-255.

* cited by examiner

METHOD AND SYSTEM FOR PERFORMING MANAGEMENT OF A LUMINAIRE NETWORK

CROSS-REFERENCE TO RELATED APPLICATIONS

The present application is a national stage entry of PCT/EP2021/066694 filed Jun. 18, 2021, which claims priority to NL 2025859 filed Jun. 18, 2020, the contents of each of which are hereby incorporated by reference.

FIELD OF INVENTION

The field of the invention relates to methods and systems for performing management, in particular light management, in a luminaire network comprising a plurality of luminaires, in particular an outdoor luminaire network (OLN). The invention also relates to a computer program for performing such methods.

BACKGROUND

Outdoor luminaires, such as luminaires for roadways, streets, parking facilities, etc. located within a predetermined area, are normally managed by a single authority. Central control and management by one authority allows better security, better coordination of use, and reduced maintenance cost. With the rise of the Internet and wireless communication systems, there is a trend toward networking of outdoor luminaires and managing operation of the outdoor luminaires through a centralized control system.

Management of an outdoor lighting network (OLN) may be remotely managed to control the lighting behavior (e.g., scheduling of the on/off times of the luminaires and/or setting dimming levels of the lighting units) and/or to monitor luminaire characteristics (e.g. light source status, energy consumption, luminaire specifications, etc.). Management of outdoor lighting networks may provide one or more benefits to customers (e.g., municipalities) such as increased security, energy savings, reduced maintenance costs, and reduced lighting pollution, etc.

One or more luminaires of an outdoor luminaire network typically comprises an outdoor lighting controller (OLC) capable of managing one or more luminaires by means of communication protocols. The OLCs may form a large network in which the communication links are based e.g. on IEEE 802.15.4 or on a LoRa wireless data communication technology. The network may be managed from the back-end by means of a plurality of segment controllers connecting the networks with the Internet. In such a solution an OLC includes a central processing unit (CPU) and a communication interface. In addition or alternatively, the OLC itself may be capable of communicating directly with the Internet.

Surveillance plays an increasingly important role in various outdoor environments, such as monitoring traffic and environmental conditions, improving safety, and responding to emergencies. Such surveillance data are often required to be delivered to a back-end server within a certain time frame. Also, operational data of a luminaire, such as data indicative for a broken component, e.g. a broken light source, data regarding the energy consumption of the luminaire, a light level, etc. are often required to be delivered to a back-end server in time. Real-time monitoring as well as "after the fact" capture of environment data such as audio, video, image, air quality data has many useful applications from monitoring places with strict security requirements to providing a sense of safety and security in public spaces, e.g. parks, roadways, etc.

It is further known to use resources from a resource server in communication with said central control system, wherein the central control system uses the resources, such as weather or traffic data, from the resource server to reconfigure one or more luminaires of the luminaire network.

SUMMARY

The object of embodiments of the invention is to provide a method and system of performing management in a luminaire network so that the security of the environment is improved.

According to a first aspect there is provided a method of performing management in a luminaire network comprising a plurality of luminaires and a control system, each luminaire of said plurality of luminaires being configured to operate in accordance with at least one profile which defines one or more settings of the luminaire in function of time. The method comprises performing by said control system the steps of: retrieving traffic data, in particular vehicle and/or pedestrian traffic data, from at least one traffic database; retrieving weather data; predicting for each luminaire the motion related conditions for a future period of time based on the retrieved traffic data and the retrieved weather data; and determining for each luminaire of said plurality of luminaires whether the at least one profile needs to be changed for said future period based on the predicted motion related conditions and/or determining at least one profile for use in said future period based on the predicted motion related conditions and/or determining at least one value representative for at least one profile for use in said future period based on the predicted motion related conditions.

The motion related conditions may be related to any one or more of the following: vehicle and/or pedestrian traffic conditions in the vicinity of the luminaire, weather conditions in the vicinity of the luminaire, ground surface conditions in the vicinity of the luminaire, and more generally to any conditions influencing the motion of vehicles (e.g. automobiles or bicycles) and/or pedestrians circulating in the vicinity of the luminaire, which are relevant for setting a profile, such as a lighting profile, which defines one or more settings of the luminaire in function of time. The vicinity of the luminaire is the area in which the luminaire operates.

Other profiles may be set, such as a sensing profile, a data emitting profile, a sanitizing profile, an operating profile. The sensing profile defines one or more sensing settings, e.g. accuracy, acquisition rate, number of measurements, of the luminaire in function of time. The data emitting profile defines one or more data emission settings, e.g. bandwidth, frequency of emission, amount of data, packet size, of the luminaire in function of time. The sanitizing profile defines one or more settings for air purification, e.g. operating times, type of substance purified. For example, where the luminaire comprises a disinfectant means such as a disinfectant spraying device or a UV light, and when the infrastructure use and/or feature affecting parameters indicate that the people traffic is low, an activation profile may be determined in which the disinfectant means are activated and optionally also a flash light is activated to indicate that the luminaire will be spraying disinfectant. The operating profile is generally associated to a corresponding device comprised in the luminaire and remotely controllably; and the operating profile defines one or more operational setting, e.g. operating times, data acquisition, actuation settings, etc.

The existing traffic databases typically comprise current traffic data, e.g. current vehicle traffic data and/or historical traffic data. By using this traffic data in combination with weather data (current and/or forecast), e.g. weather data sensed locally in some luminaires of the luminaire network and/or weather data from a weather database, motion related conditions can be predicted in an accurate manner for a future period, typically a rather short period of time in the near future.

Taking into account the predicted motion related conditions, one or more profiles, such as a lighting profile defining one or more lighting settings of the luminaire in function of time or a sensing profile defining one or more sensing settings of the luminaire in function of time or an activation profile defining when a component of the luminaire should be activated, can be updated in an improved manner. This allows creating a safer environment, in particular a safer driving environment, and more in particular a driving environment which is also suitable for self-driving, and/or a safer environment for pedestrians. Indeed, when it is expected that the traffic will be dense in the future period, e.g. the light intensity may be increased. In another example, when the traffic in the future period is very low, but the weather data indicate that it is rainy and/or windy so that visibility is poor and a risk of objects on the road is high, the light intensity may also be high compared to a situation with a low amount of traffic and good weather conditions in the future period where the light intensity could be lower. In another example, in addition or alternatively, when it is expected that the vehicle traffic will be dense in the future period, a pollution sensor of a luminaire may be activated e.g. at regular time intervals within the future period. In other words the operation of a luminaire of the luminaire network can be managed more accurately based on predicted motion related conditions for that luminaire for a future period. Such an accurate management will allow providing an environment with improved security whilst at the same time minimizing energy consumption by adjusting the at least one profile in accordance with the needs.

Although it is known to predict traffic in function of time based on historical traffic data, predicting motion related conditions at the location of a luminaire taking into account current and/or historical traffic data and weather data has not been done before, and allows accurately predicting the motion related conditions at the location of a luminaire. It is noted that the traffic data retrieved from the traffic database may comprise traffic data of a larger area comprising a portion of the luminaire network or the entire luminaire network, so that the motion related conditions at a particular luminaire of the luminaire network can be predicted taking into account the traffic conditions in the surroundings of that luminaire as well as the weather in the surroundings of that luminaire.

By predicting motion related conditions, the control system is given more time to transmit at least one updated appropriate profile or at least one value representative for such at least one profile prior to starting time at which the at least one profile has to be applied, i.e. prior to the future period.

It is noted that either at least one profile for use in said future period based on the predicted motion related conditions may be determined or at least one value representative for at least one profile for use in said future period may be determined based on the predicted motion related conditions. For example, a number of predetermined profiles may be stored in a memory and each predetermined profile may be associated with a unique identifier. Instead of determining the profile to be used, an identifier of the profile to be used may then be determined. In another example, the luminaire may be installed according to a default profile, and at least one difference value indicating the difference with the default profile may be determined. In yet another example, the luminaire may be operating according to a currently set profile, and at least one difference value indicating the difference with the currently set profile may be determined. Further it is noted that the control system may determine at least one profile for use in said future period based on the predicted motion related conditions or at least one value representative for at least one profile for use in said future period may be determined based on the predicted motion related conditions, and that further fine-tuning of the determined at least one profile or value may be done locally within the luminaire, e.g. based on real-time sensed data.

The control system will typically be a remote central control system remote of the plurality of luminaires but could also be a distributed control systems, e.g. a control system where parts of the control system are located in one or more luminaires, and/or in one or more segment controllers or fog devices between the luminaires and a central server.

Preferably, the at least one profile comprises a lighting profile which defines one or more lighting settings of the luminaire in function of time. Preferably, the one or more lighting settings include one or more of the following: light intensity, lighting pattern or intensity distribution, light spectrum (e.g. light color), a dimming level. By lighting pattern or intensity distribution, it is meant the distribution of the luminous intensity (expressed in candela, cd; or lumen/steradian, 1 m/sr) as a function of the emission direction of the light leaving the luminaire. The intensity distribution is contained within a spatial envelope of the emitted light.

For example, the luminaire may comprise a light source and an optical element which are moveable with respect to each other so that the lighting pattern may be changed by moving the optical element with respect to the light source, or by tuning properties the optical element with respect to the light source. In another example, the light source of the luminaire comprises multiple groups of light emitting elements, which can be driven independently of each other in order to adjust the lighting pattern. Examples of luminaires with a lighting pattern and/or the light spectrum which can be changed in function of time are disclosed in the following patent applications in the name of the applicant which are included herein by reference: PCT/EP2019/087022, PCT/EP2019/087019, PCT/EP2019/087023, PCT/EP2019/087024, PCT/EP2019/087016, PCT/EP2019/087013, PCT/EP2020/053652, PCT/EP2020/054677, NL2024571, PCT/EP2019/069964, PCT/EP2020/087709.

Also other components of the luminaire such as sensors, communication interfaces, disinfectant means, etc., may be operated in accordance with a profile which is based on the predicted motion related conditions. For example, when the luminaire comprises one or more further components such as a pollution sensor and/or a camera and/or a communication means, then the one or more further components may be operated in accordance with a profile in function of time which defines one or more operating characteristics of the one or more further components in function of time. For example, when the luminaire comprises a camera and a communication means, the camera and the communication means may be operated so that images are communicated with a frequency which is a function of the predicted motion related conditions. In another example, where the luminaire comprises a disinfectant means such as a disinfectant spraying device or a UV light, and when the motion affecting parameters indicate that the people traffic is low, an activation profile may be determined in which the disinfectant means are activated and optionally also a flash light is activated to indicate that the luminaire will be spraying disinfectant. Examples of luminaires with a disinfectant means, use of multiple sensors, and data sensing related to visibility are disclosed in the following patent applications in the name of the applicant which are included herein by reference: PCT/EP2021/064442, PCT/EP2019/074380, PCT/EP2019/056713.

According to a preferred embodiment, the step of retrieving of weather data comprises retrieving weather data from at least one weather database and/or retrieving weather data sensed by a sensor associated with one or more luminaires of the plurality of luminaires. If the weather data is sensed locally at a luminaire, the predicting of the motion related conditions can be further improved. In further developed embodiments, weather data from a database can be combined with locally sensed data. Especially when the weather is bad, such a combined approach allows to greatly improve the accuracy of the predicting of the motion related conditions, and thus also the determining of the appropriate settings while enabling energy savings, and in particular the appropriate lighting settings for driving, and more in particular for enabling self-driving.

According to a, exemplary embodiment, the step of determining may be further based on the current weather conditions or ground surface conditions, e.g. current weather conditions or ground surface conditions sensed locally at the luminaire Taking into account the weather and/or ground surface conditions for determining at least one profile to be used for the future period allows further improving the determining of the most appropriate profile(s) for the future period.

Preferably, the future period is smaller than 2 hours, preferably smaller than 1 hour, even more preferably smaller than 30 minutes. Preferably, the future period is larger than 1 minute, more preferably larger than 5 minutes, even more preferably larger than 10 minutes. For example, the future period can cover a time period with a duration between 15 and 60 minutes, starting shortly after the current time. For example, if the predicting is done at time t0, then the future period could start at time t1=t0+DT, where DT is smaller than 15 minutes, preferably smaller than 5 minutes, but preferably larger than 1 minute. In that manner, the control system is given some time to do the calculation of the predicting and the determining, and to transmit the at least one profile or the at least one value representative for the at least one profile to the luminaire. The future period could last for a duration T e.g. between 15 and 60 minutes. Thus the future period would be the time period between t=t1 and t=t1+T. The next prediction can then be performed shortly before t1+T, so that the next future period can start at t1+T.

In a preferred embodiment, the step of predicting, the step of determining, and at least one of the steps of retrieving traffic data and retrieving weather data are performed multiple times for multiple consecutive future periods. Preferably said steps are performed periodically. The periodicity of the retrieving of the traffic data may be different from the periodicity of the retrieving of the weather data. The step of predicting and determining is preferably performed with the same period as the future period.

In an exemplary embodiment, the method further comprises adjusting a duration of a future period of said multiple consecutive periods in function of the retrieved traffic data and/or the retrieved weather data and/or the predicted motion related conditions. For example, a first future time period may have a duration T1 and may be from t1 to t2=t17+T1, and a second future time period may be from t2 to t2+T2, where T2 is smaller than T1. This may be the case, e.g. if the traffic data retrieved shortly before t2 indicate that the traffic has increased. Also, for example, weather data does not have to be read or processed every 10 minutes if the weather is clear and the weather fore cast is good, while it makes sense to refresh frequently when the weather is poor and variable. Also, when the weather forecast is good, it may be decided to only retrieve the traffic data periodically.

According to an exemplary embodiment the method further comprises a step of obtaining at least one reliability value indicating the reliability of the retrieved traffic data, wherein the step of predicting and/or the step of determining is based on the at least one reliability value. For example, when the reliability value indicates that the retrieved traffic data is very reliable more weight may be given to the traffic data e.g. in order to determine whether or not to change the at least one profile.

For example, the at least one reliability value may be based on a number of vehicles and/or pedestrians circulating in the vicinity of the luminaire Indeed, if that number is very high it may be determined that the traffic data, e.g. an average speed of a vehicle in the vicinity of the luminaire, is reliable.

According to an exemplary embodiment, the step of retrieving traffic data comprises a step of retrieving historical first traffic data for a first period of time and retrieving second traffic data for a current moment in time or for a second period which is shorter and more recent than the first period of time. The second traffic data is obtained more regularly than the first traffic data. The step of predicting motion related conditions for a future period of time may then be based on the first and the second traffic data and on the weather data. Preferably, a traffic reliability value indicating the reliability of the second traffic data is obtained, and the predicting is further based on the traffic reliability value. In that manner more weight may be given to the second traffic data than to the first traffic data if the reliability value indicates a high reliability whilst more weight may be given to the first traffic data than to the second traffic data when the reliability value indicates a low reliability. Optionally a weather reliability value indicating the reliability of the weather data is obtained, and optionally the predicting is further based on the weather reliability value.

In addition or alternatively, the method may further comprise a step of retrieving historical traffic data and/or historical weather data covering a first period of time; and the step of retrieving the weather data and/or the step of retrieving the traffic data is repeated periodically every second period of time; said first period of time being longer than said second period of time. At least one first operating profile may then be determined based on the historical traffic data and/or historical weather data for said first period. The step of predicting may then be based on the second traffic data, and, based on the predicted motion related conditions, it may then be determined for each luminaire at least one of
 whether the at least one first profile needs to be changed for said future period; and
 at least one second profile to be used for said future period or at least one value representative for at least one second profile to be used for said future period, said at least one second profile being different from said at least one first profile.

Optionally, the step of predicting for each luminaire motion related conditions for a future period comprises selecting a class from a plurality of classes, each class being representative for predetermined motion related conditions, based on the retrieved traffic data and the retrieved weather data. Using the selected class, it may then be determined whether the at least one profile needs to be changed and/or which at least one profile to be used for the future period of time.

For example, the classes may be defined based on:
traffic data related to e.g. speed and/or direction and/or number of occupants of a vehicle or person;
type of weather (fog, sun, rain, wind), amount of rain, humidity level, snow level, wind speed, the temperature, the light level.

In an exemplary embodiment, the method further comprises storing one or more predetermined lighting rules defining one or more lighting requirements in function of motion related conditions. The step of determining may then be further based on said one or more predetermined lighting rules. Such lighting rules can be derived from a lighting regulation or standard applicable in the area where a luminaire is located. Multiple regulations may exist at different hierarchical levels, such as city, state, national. In addition or alternatively, also other regulations, e.g. regulations with regard to sensed data or communication regulations may be taken into account when performing the step of determining.

The skilled person will understand that the storing of one or more predetermined lighting rules as described above can similarly be applied to operating rules of other devices included in a luminaire, e.g. sensing rules, data emitting rules, sanitizing rules, etc.

In a preferred embodiment, a luminaire of the plurality of luminaires may be tagged with one or more infrastructure tags representative for one or more infrastructure features and/or infrastructure uses, and the step of determining may be further based on the one or more infrastructure tags. By tagging the luminaire with an infrastructure tag, the profile may be fine-tuned to the particular infrastructure use or feature. For example, an intensity level of a luminaire in a school area may be increased in time periods where many children are expected in the school area. An infrastructure use may comprise information about the use of one or more infrastructure features in function of time. For example, for a school, the infrastructure use may specify when the school opens and closes. For example, for a bus stop, the infrastructure use information may specify the arrival times of the busses at the bus stop.

The one or more infrastructure tags may comprise one or more of the following features: a transportation stop such as a bus stop, a pedestrian crossing, a cycle crossing, a speed control bump (lying policeman), a school, a hospital, a low speed area, a residential use, a night life use, an animal crossing area, a junction, a roundabout, a conflict area.

The conflict area (see also the CIE 115-2010 standard) may be defined as an area where there is an increased potential for collision between road users, e.g. entry or exit lanes to the highway, crossroads, roundabouts, pedestrian crossings, etc.

In an exemplary embodiment, the method may comprise retrieving a position of a luminaire of the plurality of luminaires from a luminaire network database; and the step of tagging the luminaire with one or more infrastructure tags may comprise, based on the retrieved position, selecting at least one infrastructure use and/or infrastructure feature from an infrastructure database, said infrastructure database storing a plurality of different infrastructure uses and/or features.

In a further developed embodiment, an infrastructure tag may be linked with a use in function of time, and this use in function of time may be taken into account in the determining step. For example, for a bus stop infrastructure tag, an indication of the time periods when the bus stop is used may be linked to the tag. The lighting profile may then be set so that the light intensity is increased when the bus stop is expected to be in use. Optionally, also the infrastructure tab may be associated with a reliability value indicating the reliability of an infrastructure use and/or feature corresponding to the infrastructure tag. For example, when the reliability value indicates that the infrastructure use and/or feature is very reliable, more weight may be given to the infrastructure use and/or feature associated to the infrastructure tag.

In an exemplary embodiment, the method further comprises retrieving environmental sensor data from one or more environmental sensors associated with one or more luminaires of the plurality of luminaires; and the step of determining is further based on the environmental sensor data. For example, the determining may be further based on data sensed by a light sensor or a motion sensor of one or more luminaire of the luminaire network. Optionally, also the locally sensed data may be associated with a reliability value indicating the reliability of the locally sensed data. For example, when there is a lot of fog, the reliability value of data sensed by a camera may indicate a low reliability as compared to the reliability value of data sensed by a camera on a sunny day. Such reliability value may then be further used in the step of predicting and/or determining, wherein more weight is attributed to data associated with a reliability value indicating a high reliability as compared to data associated with a reliability value indicating a low reliability.

The one or more environmental sensors may sense environmental data, e.g. luminosity, visibility, weather condition, sound, dynamic object (presence and/or speed), ground condition such as a ground reflectivity property, humidity, temperature, a lighting pattern, etc. of the surroundings of the luminaire system.

The one or more environmental sensors may comprise one or more of the following: a light sensor, an image sensor, a motion detector, sound sensor, a radar sensor such as a Doppler effect radar sensor, a pollution sensor such as a detector of CO2, NOx, smoke, a humidity sensor, a temperature sensor, a voice recorder, a microphone, a virus detection sensor, an infrared sensor, etc.

Preferably, the one or more traffic databases include one or more of the following: a database containing for a number of locations one or more of the following: a number of vehicles and/or pedestrians that has passed that location during a predefined time period, an average speed of passing vehicles and/or pedestrians at that location, incident related information (e.g. information about a car accident) indicating whether an incident was detected near the location, a ground surface state at that location (e.g. icy road, snow on the surface, etc.), a database based on traffic information from users of navigation system, a database with data retrieved via toll stations, a database with data derived from mobile communication data (e.g. data based on cell phone localization), a database with data based on RDS-TMC (Radio Data System—Traffic Message Channel) traffic messages, a database with information about events, in particular mass events.

According to a further aspect of the invention, there is provided a computer program comprising computer-executable instructions to perform or control the steps of the method, when the program is run on a computer, according to any one of the embodiments of the method disclosed above. According to a further aspect of the invention, there is provided a computer device or other hardware device programmed to perform or control the steps performed by the luminaire controller of any one of the embodiments disclosed above. According to another aspect there is provided a data storage device encoding a program in machine-readable and machine-executable form to perform or control the steps performed by the luminaire controller of any one of the embodiments disclosed above.

Typically, the luminaires are outdoor luminaires. By outdoor luminaires, it is meant luminaires which are installed on roads, tunnels, industrial plants, stadiums, airports, harbors, rail stations, campuses, parks, cycle paths, pedestrian paths or in pedestrian zones, for example, and which can be used notably for the lighting of an outdoor area, such as roads and residential areas in the public domain, private parking areas and access roads to private building infrastructures, etc.

Communication technologies used by OLNs include any one or more of: an IEEE 802.15.4-based protocol, such as a Zigbee protocol, WiFi, cellular (GPRS, 3G/4G/5G), LPWAN, e.g. a LoRaWAN or a SigFox, and power line communication networks.

According to another aspect of the invention, there is provided a control system for a luminaire network comprising a plurality of luminaires, each luminaire of said plurality of luminaires being configured to operate in accordance with at least one profile which defines one or more settings of the luminaire in function of time, said control system being configured for retrieving traffic data from at least one traffic database; retrieving weather data; predicting for each luminaire the motion related conditions for a future period of time based on the retrieved traffic data and the retrieved weather data; based on the predicted motion related conditions, determining for each luminaire of said plurality of luminaires whether the at least one profile needs to be changed for said future period; and/or at least one profile to be used for said future period and/or at least one value representative for at least one profile to be used for said future period.

Preferred embodiments of the control system are disclosed in the claims. The technical merits of the embodiments of the method apply mutatis mutandis on the various embodiments of the control system. Also, the control system may be configured to perform any one of the above disclosed method steps.

According to another aspect there is provided a luminaire network comprising a plurality of luminaires and a control system according to any one of the embodiments above for managing said plurality of luminaires.

According to a further aspect there is provided a method of performing management in a network comprising a plurality of devices, such as bins or luminaires or street furniture or sensors, and a control system Each device of said plurality of devices may be configured to operate in accordance with at least one profile. A profile may e.g. define one or more settings of the device in function of time. A profile may also be a profile for performing a certain action related to the device, e.g. the emptying of a bin. The method comprising performing by said control system the steps of: retrieving traffic data, in particular vehicle and/or pedestrian traffic data, from at least one traffic database; retrieving weather data; predicting for each device the motion related conditions for a future period of time based on the retrieved traffic data and the retrieved weather data; and determining for each device of said plurality of devices whether the at least one profile needs to be changed for said future period based on the predicted motion related conditions and/or determining at least one profile for use in said future period based on the predicted motion related conditions and/or determining at least one value representative for at least one profile for use in said future period based on the predicted motion related conditions. Thus, embodiments of the invention may also be used in other kinds of networks.

For example, in a network of bins where a bin is provided with a cleaning means to clean and/or disinfect the bin, a cleaning profile may be changed based on the motion related data. Also, a profile used for emptying the bins may be changed depending on the motion related data. For example, when it is predicted that many people will be in the vicinity of the device, the device may be cleaned and/or emptied more often or at a different time compared to a situation where it is predicted that few people will be present.

For example, in a sensor network, a sensing profile may be changed depending on the predicted motion related data. For example, in a camera network, an operating profile to operate the camera may be changed depending on the motion related data. For example, in a pollution sensor network, an operating profile to operate a pollution sensor may be changed depending on the motion related data.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1:
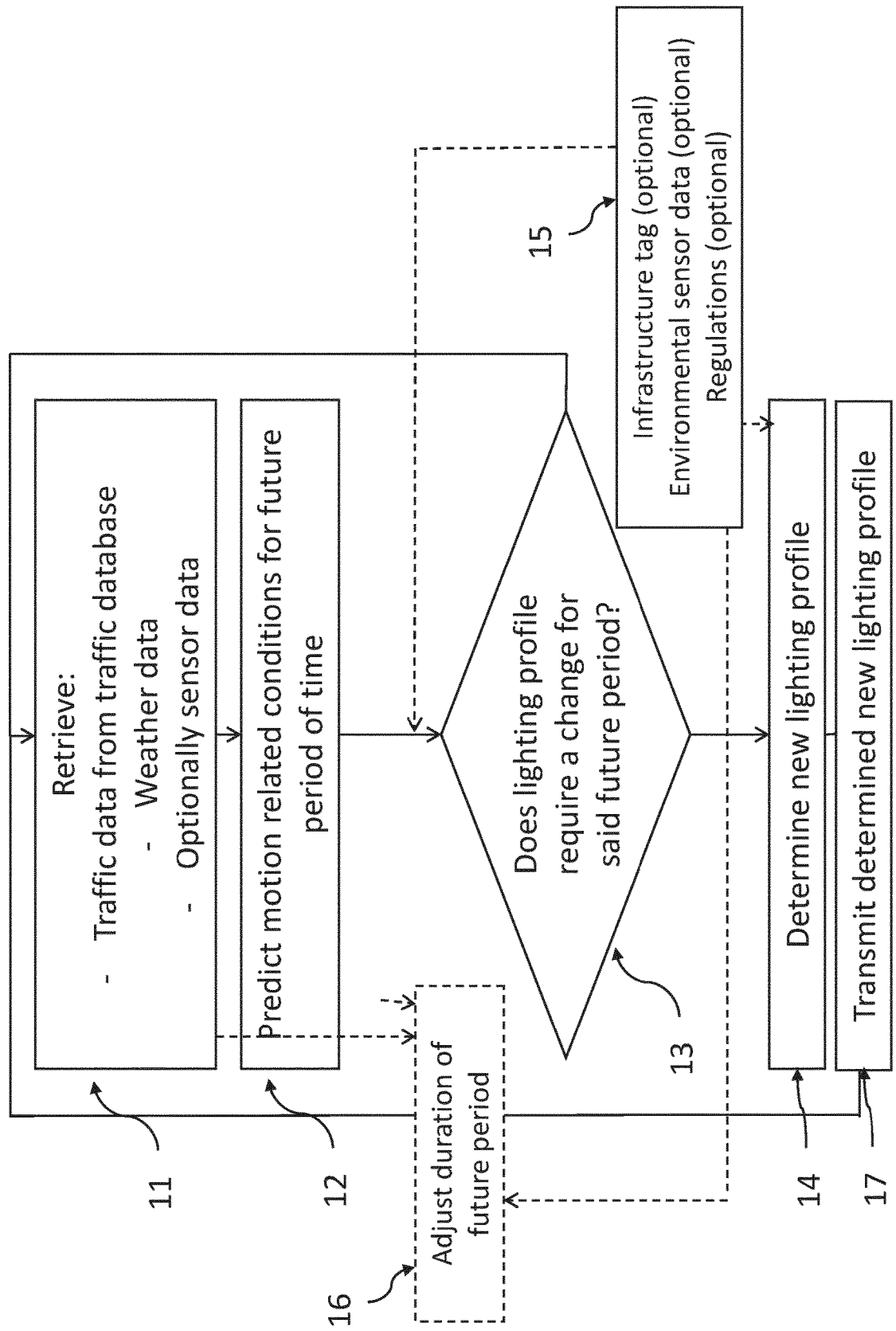
FIG. 1 illustrates a flow chart of an exemplary embodiment of a method for managing a luminaire of a luminaire network.

FIG. 1 illustrates a first embodiment of a method of performing management in a luminaire network. The luminaire network comprises a plurality of luminaires and a control system. A luminaire of said plurality of luminaires is configured to operate in accordance with at least one profile which defines one or more settings of the luminaire in function of time. The luminaire typically comprises a light source, an optical element, one or more further components such as a sensor or a communication interface, and a driver for driving the light source and optionally for driving also one or more further components. Typically the luminaire is an outdoor luminaire as defined above with a luminaire head or a luminaire pole module having a housing comprising at least the light source and the optical element. The luminaire head may be mounted on a base, typically a pole, either in a post-top or side-entry configuration. Examples of such luminaire heads are disclosed in Dutch patent applications NL2023431 and NL2025081 in the name of the applicant which are included herein by reference.

A luminaire pole module may be part of a modular luminaire comprising multiple pole modules arranged one above the other. Examples such modular luminaires are disclosed in EP3076073B1, WO2019043045A1, WO2019053259A1, and NL2024248 in the name of the applicant which are included herein by reference.

The method comprises performing the following steps by a control system. The control system may be a centralized control system at a location remote of the luminaires of the luminaire network but may also be a distributed control system in which a part of the controlling is done within the luminaires.

In a first step 11, the following data is retried: traffic data (current and/or historical) from at least one traffic database and weather data (current and/or forecast). The one or more traffic databases may include one or more of the following: a database containing for a number of locations at least one of a number of vehicles and/or pedestrians that has passed that location during a predefined time period and an average speed of vehicles and/or pedestrians at that location and/or a ground surface state (e.g. icy road, road covered with snow, flooded road, etc.), a database based on traffic information from users of navigation system, a database with data retrieved via toll stations, a database with data derived from mobile communications (e.g. data based on cell phone localization), a database with data based on RDS-TMC (Radio Data System—Traffic Message Channel) traffic messages, a database with information about events, in particular mass events. Optionally, also other data, such as sensor data may be retrieved, e.g. locally in one or more luminaires. For example, a luminaire may be provided with a detection means configured to count the number of people or vehicles that have passed in the vicinity of the luminaire, or to measure the average speed, or to take images with information about the environment in the vicinity of the luminaire Such information may be retrieved also by the control system. Alternatively or in addition, the locally sensed data may be used locally, and the determined profile may be adjusted locally in function of locally sensed data.

According to an exemplary embodiment, the control system is configured for counting a number of persons in the vicinity of the one or more luminaire systems. For example, the control system may be configured for counting a number of persons that have passed through a predetermined area in the vicinity of multiple luminaire systems of the luminaire network and for determining a movement pattern. Also such computed data may be used by the control system, thereby allowing improvement in prediction step 12 discussed below.

The step of retrieving weather data may comprise retrieving weather data (current and/or forecast) from at least one weather database and/or retrieving weather data sensed by a sensor associated with one or more luminaires of the plurality of luminaires.

In a second step 12 the motion related conditions are predicted for each luminaire for a future period of time, based on the data retrieved in step 11. The motion related conditions may be related to any one or more of the following: vehicle and/or pedestrian traffic conditions in the vicinity of the luminaire, weather conditions in the vicinity of the luminaire, ground surface conditions in the vicinity of the luminaire, and more generally to any conditions influencing the motion of vehicles (e.g. automobiles or bicycles) and/or pedestrians and/or animals circulating in the vicinity of the luminaire, which are relevant for setting a profile, such as a lighting profile, which defines one or more settings of the luminaire in function of time.

In a third step 13, the predicted motion related conditions for the future period are used for determining for each luminaire of said plurality of luminaires whether the at least one profile needs to be changed for said future period. In the example of FIG. 1 the at least one profile is a lighting profile, but instead or in addition another profile could be used as has been explained above in the summary. In addition or alternatively, the predicted weather conditions may be used for determining for a luminaire of said plurality of luminaires whether the at least one profile needs to be changed for said future period. For example, in step 13, if the motion related conditions predicted in step 12 show minimal changes compared to the motion related conditions of a past period, it may be determined that the at least one profile does not need to be changed, in which case the method returns to step 11. If it is determined that the at least one profile requires a change, then in step 14 at least one updated profile is determined for the future period. Alternatively, at least one value representative for at least one profile for use in said future period is determined based on the predicted motion related conditions.

In a fourth step 17, the at least one determined profile is transmitted by the control system to the respective luminaire Optionally further fine-tuning of the at least one determined profile may take place in the respective luminaire, e.g. based on real-time locally sensed data.

It is noted that steps 13 and 14 could also be a single step in which at least one profile or value representative for at least one profile for said future period is determined regardless of whether the motion related conditions have changed compared to a previous period. In such an implementation the determined at least one profile could then be identical to the current at least one profile (determined for a previous period).

Optionally one or more predetermined lighting rules defining one or more lighting requirements in function of weather and/or motion related conditions may be stored, and step 13 and/or 14 may be based on said one or more predetermined lighting rules, see reference numeral 15. Such lighting rules can be derived from a lighting regulation or standard applicable in the area where a luminaire is located. Multiple regulations may exist at different hierarchical levels, such as city, state, national. In addition or alternatively, also other regulations, e.g. regulations with regard to sensed data or communication regulations may be taken into account when performing step 13 and/or 14.

The skilled person will understand that the storing of one or more predetermined lighting rules as described above can similarly be applied to operating rules of other devices included in a luminaire, e.g. sensing rules, data emitting rules, sanitizing rules, etc.

Optionally, a luminaire of the plurality of luminaires may be tagged with one or more infrastructure tags representative for one or more infrastructure features and/or infrastructure uses, and step 13 and/or 14 may be further based on the one or more infrastructure tags, see reference numeral 15 in FIG. 1. The one or more infrastructure tags comprise one or more of the following: a transportation stop such as a bus stop, a pedestrian crossing, a cycle crossing, a speed control bump (lying policeman), a school, a hospital, a low speed area, a residential use, a night life use, an animal crossing area, a junction, a roundabout. In order to associate an infrastructure tag to a luminaire, the method may further comprise retrieving a position of a luminaire of the plurality of luminaires from a luminaire network database; and based on the retrieved position, selecting at least one infrastructure use and/or infrastructure feature from an infrastructure database, said infrastructure data database storing a plurality of different infrastructure uses and/or features. The one or more infrastructure tags may include an indication of an infrastructure use in function of time.

Optionally the method further comprises retrieving environmental sensor data from one or more environmental sensors associated with one or more luminaires of the plurality of luminaires; and the step 13 and/or 14 may be further based on the environmental sensor data. The one or more environmental sensors may comprise one or more of the following: a light sensor, an image sensor, a motion detector, sound sensor, a radar sensor, a pollution sensor, a humidity sensor, a temperature sensor, a light pattern sensor, a virus detection sensor.

Preferably, the at least one profile comprises a lighting profile which defines one or more lighting settings of the luminaire in function of time. Such an example is illustrated in FIG. 1. The one or more lighting settings may include one or more of the following: light intensity, lighting pattern or light intensity distribution, light spectrum (e.g. light colour), a dimming level. For example, depending on the predicted motion related conditions, the lighting pattern could be adjusted from a lighting pattern illuminating two lanes of a road to a lighting pattern illuminating only one lane. Also, in the event of road works the lighting pattern could be adjusted. A change of the lighting pattern may be combined with a change of the light intensity and/or a change of the light colour.

Preferably, the steps 11, 12, 13, 14 are performed multiple times for multiple consecutive future periods, wherein preferably said steps 11, 12, 13, 14 are performed periodically.

Optionally, the method may comprise a further step 16 of adjusting a duration of a future period of time in function of the retrieved traffic data and/or the retrieved weather data and/or the predicted motion related conditions and/or in function of sensor data and/or in function of changed regulations and/or in function of a changed infrastructure use, etc.

In table 1 below an example is illustrated of how the lighting profile could vary. The first row contains multiple consecutive time periods, T1, T2, etc. In the example, the weather and traffic fluctuations are very fast for illustrative purposes but in practice the fluctuations will typically take place over many more periods, especially when the duration of the periods T1, T2 is chosen to be rather small, e.g. smaller than 15 minutes.

TABLE 1

| time | T1 | T2 | T3 | T4 | T5 | T6 | T7 |
|---|---|---|---|---|---|---|---|
| Predicted traffic conditions | Traffic increasing | Traffic very dense | Traffic very dense | Traffic decreasing | Traffic further decreasing | Traffic low | Traffic low |
| Predicted weather conditions | Good | Good | Raining | Heavy showers | Light rain | Light rain | Good |
| Light profile in function of time: | | | | | | | |
| Light intensity | Linear increase from I1 at t = t0 to I2 at t = t0 + T1 | Constant intensity I2 | Constant intensity I3 | Constant intensity I3 | Linear decrease from I3 to I2 | Constant intensity I1 | Constant intensity I4 (lower than I1) |
| Lighting pattern | Pattern 1 | Pattern 1 | Pattern 2 more appropriate than pattern 1 in rainy weather | Pattern 2 | Pattern 2 | Pattern 2 | Pattern 3 more appropriate than pattern 1 in case of low traffic (e.g. one lane instead of two lanes) |
| Light colour | Colour 1 | Colour 1 | Colour 2 more appropriate than colour 1 in rainy weather | Colour 2 | Colour 2 | Colour 2 | Colour 1 |

In further developed embodiments, as explained above, also other data may be taken into account when performing step 13 and/or 14. Table 2 below illustrates an example. In this example not only a lighting profile is determined but also a pollution measurement profile. In this example, the pollution profile simply consists in activating (On) or deactivating (Off) the pollution sensor of the luminaire, but the skilled person understands that more advanced profiles are possible, e.g. specifying the frequency of the pollution measurements.

TABLE 2

| time | T1 | T2 | T3 | T4 | T5 | T6 | T7 |
|---|---|---|---|---|---|---|---|
| Predicted traffic conditions | Traffic increasing | Traffic dense | Traffic dense | Traffic decreasing | Traffic low | Traffic low | Traffic increasing |
| Predicted weather conditions | Good | Good | Raining | Light rain | Light rain | Good | Good |
| Infrastructure use | School, outside of school hours | School, outside of school hours | School, outside of school hours | School starts | Students at school | Students at school | School ends |
| Light profile in function of time | | | | | | | |
| Light intensity | Linear increase from I1 at t = t0 to I2 at t = t0 + T1 | Constant intensity I2 | Constant intensity I3 | Constant intensity I3 | Constant intensity I1 | Constant intensity I4 (lower than I1) | Constant intensity I2 |
| Lighting pattern | Pattern 1 | Pattern 1 | Pattern 2 more appropriate than pattern 1 in rainy weather | Pattern 2 | Pattern 2 | Pattern 3 more appropriate than pattern 1 in case of low traffic (e.g. one lane instead of two lanes) | Pattern 1 |
| Light colour | Colour 1 | Colour 1 | Colour 2 more appropriate than colour 1 in rainy weather | Colour 2 | Colour 2 | Colour 1 | Colour 1 |
| Pollution measurement profile in function of time | | | | | | | |
| | Off | On | On | On | Off | Off | On |

35

Figure 2:
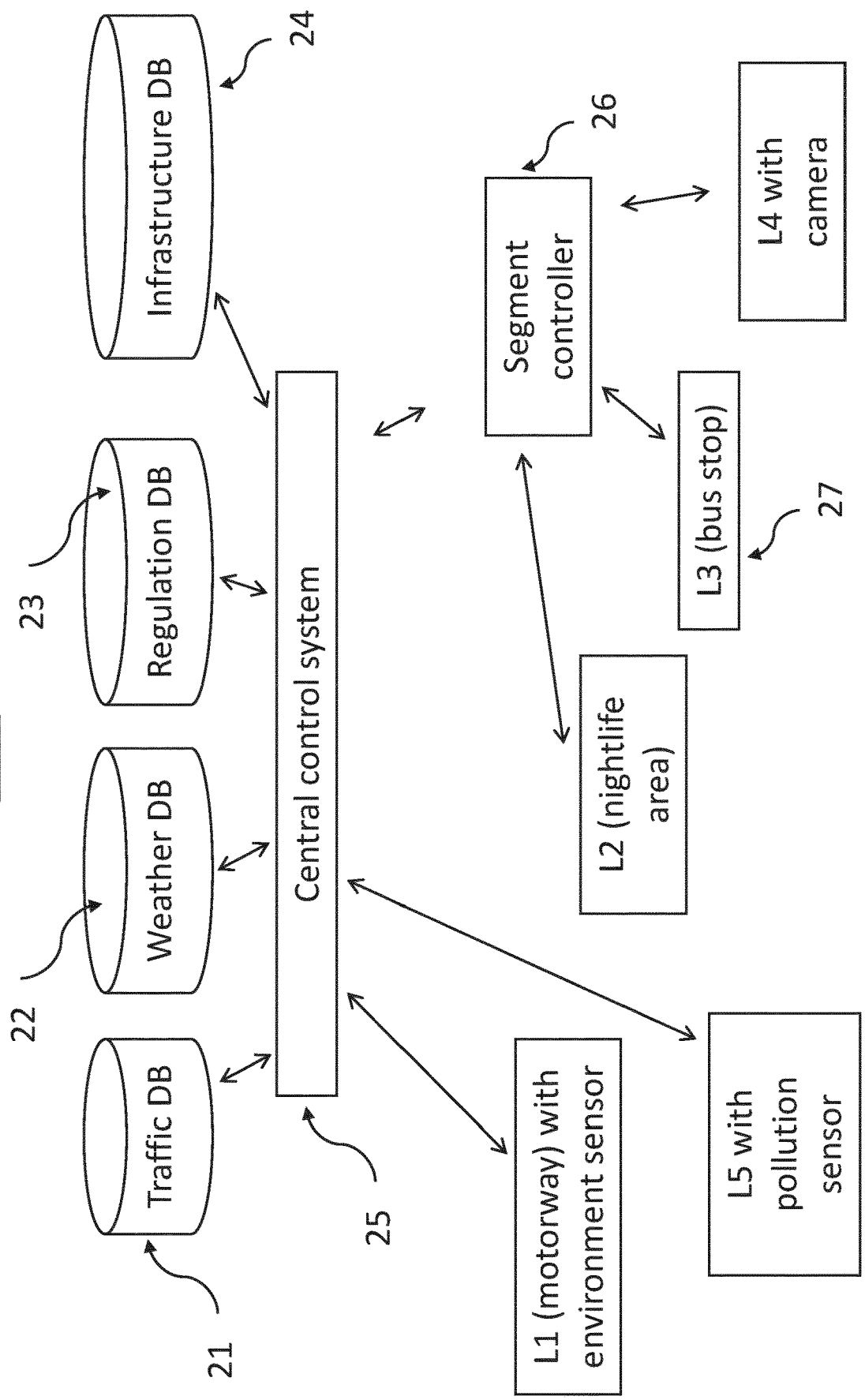
FIG. 2 is a schematic diagram illustrating a luminaire network according to an exemplary embodiment.

FIG. 2 illustrates schematically an embodiment of a luminaire network infrastructure. The luminaire network comprises a plurality of luminaires 27 (see L1, L2, etc.) in direct or indirect communication with a central control system 25. The central control system 25 has access to a plurality of databases, here a traffic database 21, a weather database 22, a regulation database 23 and an infrastructure database 24. Those databases 21, 22, 23, 24 may be used as described above in connection with FIG. 1. As illustrates some luminaires L1, L4, L5 may be provided with a sensing means, here an environment sensor (e.g. any one of the environmental sensors defined above), a pollution sensor and a camera, respectively. Further some luminaires L2, L3 may be tagged with an infrastructure tag. For example, for L2 the infrastructure tag indicates a nightlife area, and for L3 the infrastructure tag indicates that the luminaire is used for illuminating a bus stop. The luminaires 27 may either communicate directly with the central control system 25, e.g. through a cellular communication, or may communicate indirectly with the central control system 25, e.g. via a segment controller 26. Also a group of luminaires 27 may be arranged in a mesh network such that luminaires of the group can communicate with each other using short range communication, wherein only some of the luminaires of the group are capable of performing long range communication with the central control system 25. It will be understood that the various embodiments of the method disclosed above can be performed by the control system 25 of FIG. 2.

According to an exemplary embodiment, the luminaire network comprises a first group of luminaires and a second group of luminaires. The control system may comprise a first control means configured for collecting data sensed or received from multiple luminaire systems of the first group and/or a second control means configured for collecting data sensed or received from multiple luminaire systems of the second group. In other words, data sensed or received by the luminaire systems of the first group may be centralized in a first control means, e.g. located in one or more designated luminaire systems of the first group, and/or data sensed or received by the luminaire systems of the second group may be centralized in a second control means, e.g. located in one or more designated luminaire systems of the second group. In this way, the collected data may be processed in a structured manner, on a group level, in order to use the data in the predicting step. The first and second groups may communicate sensed or received data that have been centralized in each group to a remote device of the control system, such as a cloud or a server. In this way, data collected locally may be taken into account for predicting the motion related conditions.

Figure 3:
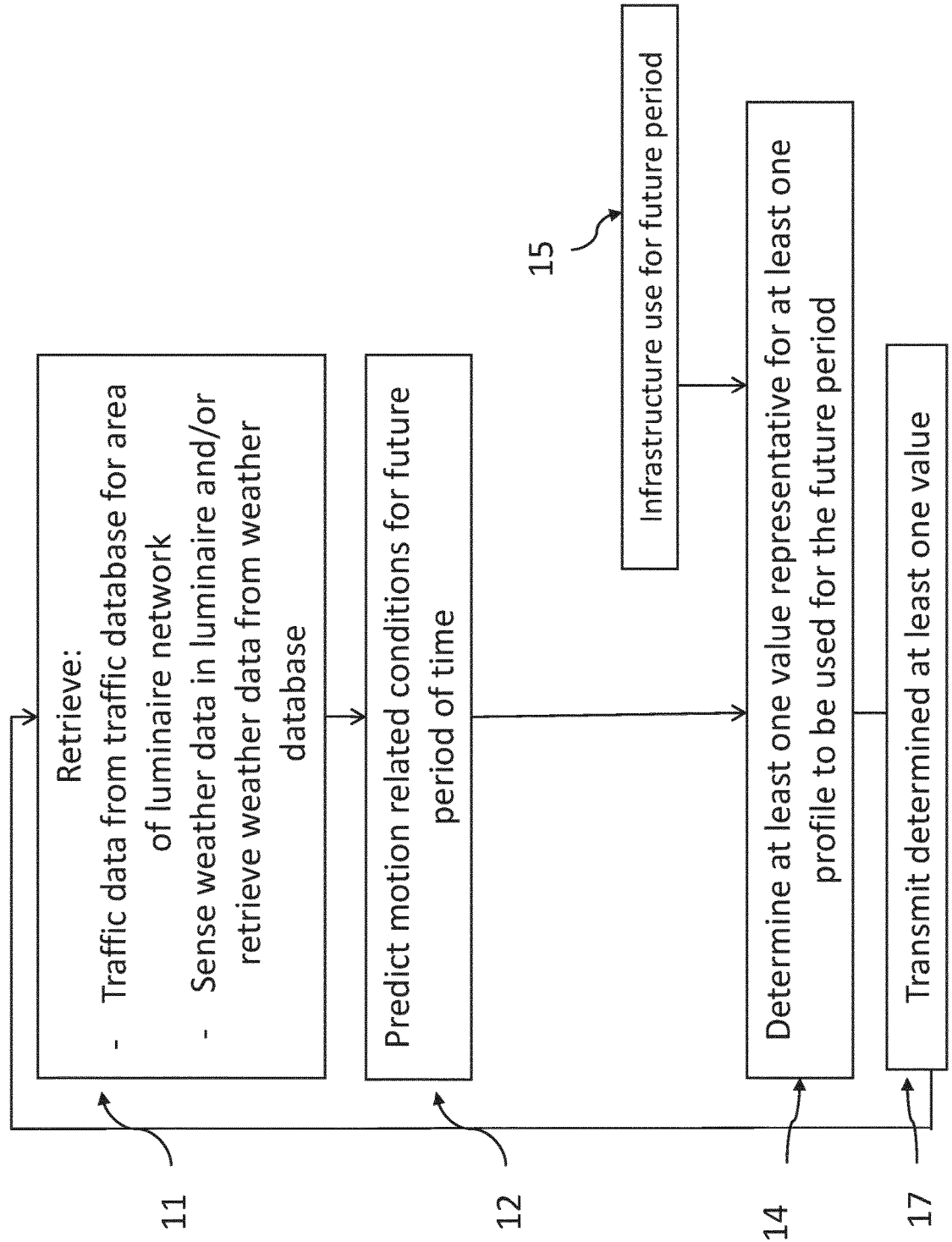
FIG. 3 illustrates a flow chart of an exemplary embodiment of a method for managing a luminaire of a luminaire network.

FIG. 3 illustrates a method which is similar to the method of FIG. 1, but where step 13 has been omitted. As explained above, the at least one profile to be used for the future period or at least one value representative the at least one profile to be used for the future period may be determined in step 14 regardless of whether the traffic and/or weather conditions have changed compared to a previous period. In such an implementation the determined at least one profile could then be identical to the current at least one profile (determined for a previous period).

For example, a number of predetermined dimming profiles may be stored in a memory and each predetermined dimming profile may be associated with a unique identifier. Instead of determining the dimming profile to be used, an identifier of the dimming profile to be used may then be determined. The same applies for other types of profiles. For example, when a luminaire comprises a spraying means, a number of different possible activation profiles may be stored, and depending on motion related conditions predicted based on pedestrians traffic data and weather data, a different activation profile may be chosen for the spraying means. For example, spraying may be activated when it is not too windy and when it is expected that no people will be around.

In a further example, the luminaire may be installed according to a default profile, and at least one difference value indicating the difference with the default profile may be determined in step 14. In another example, the luminaire may be operating according to a currently set profile, and at least one difference value indicating the difference with the currently set profile may be determined in step 14. Further it is noted that the control system may determine at least one profile for use in said future period based on the predicted motion related conditions or at least one value representative for at least one profile for use in said future period may be determined based on the predicted motion related conditions, and that further fine-tuning of the determined at least one profile or value may be done locally within the luminaire, e.g. based on real-time sensed data.

Whilst the principles of the invention have been set out above in connection with specific embodiments, it is to be understood that this description is merely made by way of example and not as a limitation of the scope of protection which is determined by the appended claims.

The invention claimed is:

1. A method of performing management in a luminaire network comprising a plurality of luminaires and a control system, each luminaire of said plurality of luminaires being configured to operate in accordance with at least one profile which defines one or more settings of the luminaire in function of time, said method comprising performing by said control system the steps of:
   retrieving traffic data from at least one traffic database, preferably at least one of vehicle or pedestrian traffic data;
   retrieving weather data;
   predicting for each luminaire motion related conditions for a future period of time based on the retrieved traffic data and the retrieved weather data, preferably motion related conditions influencing the motion behavior of at least one of vehicles or pedestrians circulating in the vicinity of the luminaire; and
   based on the predicted motion related conditions, determining for each luminaire of said plurality of luminaires:
      whether the at least one profile needs to be changed for said future period; or
      at least one profile to be used for said future period or at least one value representative for at least one profile to be used for said future period,
   wherein the method further comprises the step of obtaining at least one reliability value indicating the reliability of the retrieved traffic data, wherein at least one of the step of predicting or the step of determining is based on the at least one reliability value, and, preferably, wherein the at least one reliability value is based on a number of at least one of vehicles or pedestrians circulating in the vicinity of the luminaire.

2. The method of claim 1, wherein the at least one profile comprises: a lighting profile which defines one or more lighting settings of the luminaire in function of time, a sensing profile, a data emitting profile, a sanitizing profile, or an operating profile, and, preferably, wherein the one or more lighting settings include: light intensity, lighting pattern, light spectrum (e.g. light color), or a dimming level.

3. The method of claim 1, wherein the step of predicting, the step of determining, and at least one of the steps of retrieving traffic data and retrieving weather data are performed multiple times for multiple consecutive future periods, wherein preferably said steps are performed periodically, and, preferably, wherein the method further comprises the step of adjusting a duration of a future period of said multiple consecutive future periods in function of at least one of the retrieved traffic data, or the retrieved weather data, or the predicted motion related conditions.

4. The method of claim 1, wherein the step of retrieving traffic data comprises a step of retrieving historical first traffic data for a first period of time and retrieving second traffic data for a current moment in time or for a second period which is shorter and more recent than the first period of time, wherein the second traffic data is obtained more regularly than the first traffic data, wherein the step of predicting motion related conditions for a future period of time is based on the first and the second traffic data and on the weather data, and, preferably, wherein a traffic reliability value indicating the reliability of the second traffic data is obtained, wherein the predicting is further based on the traffic reliability value.

5. The method of claim 1, wherein the method further comprises a step of retrieving at least one of historical traffic or weather data covering a first period of time, wherein at least one of the step of retrieving the weather data or the step of retrieving the traffic data is repeated periodically every second period of time, said first period of time being longer than said second period of time, wherein at least one first operating profile is determined based on at least one of the historical traffic or weather data, and wherein, based on the predicted motion related conditions, it is determined for each luminaire:
   whether the at least one first profile needs to be changed for said future period; or
   at least one second profile to be used for said future period or at least one value representative for at least one second profile to be used for said future period.

6. The method of claim 1, wherein the step of predicting for each luminaire, motion related conditions for a future period comprises selecting a class from a plurality of classes, each class being representative for predetermined motion related conditions, based on the retrieved traffic data and the retrieved weather data.

7. The method of claim 1, wherein for each luminaire, the motion related conditions are related to any one or more of the following: at least one of vehicle or pedestrian traffic conditions in the vicinity of the luminaire, weather conditions in the vicinity of the luminaire, ground surface conditions in the vicinity of the luminaire; and, preferably, the method further comprises the step of transmitting of the determined at least one profile or of the determined at least one value representative for at least one profile to be used for said future period to the respective luminaire of the plurality of luminaires.

8. The method of claim 1, wherein a luminaire of the plurality of luminaires is tagged with one or more infrastructure tags representative for one or more infrastructure features or infrastructure uses, wherein the step of determining is further based on the one or more infrastructure tags, and, preferably, wherein the one or more infrastructure tags comprise one or more of the following: a transportation stop such as a bus stop, a pedestrian crossing, a cycle crossing, a speed control bump (lying policeman), a school, a hospital, a low speed area, a residential use, a night life use, an animal crossing area, a junction, a roundabout, a conflict area.

9. The method of claim 8, further comprising retrieving a position of a luminaire of the plurality of luminaires from a luminaire network database, wherein the step of tagging the luminaire with one or more infrastructure tags comprises, based on the retrieved position, selecting at least one infrastructure use or infrastructure feature from an infrastructure database, said infrastructure data database storing a plurality of different infrastructure uses or features.

10. The method of claim 1, further comprising retrieving environmental sensor data from one or more environmental sensors associated with one or more luminaires of the plurality of luminaires, wherein the step of determining is further based on the environmental sensor data, and, preferably, wherein the one or more environmental sensors comprise: a light sensor, an image sensor, a motion detector, sound sensor, a radar sensor, a pollution sensor, a humidity sensor, a temperature sensor, a light pattern sensor, or a virus detection sensor.

11. The method of claim 1, wherein the one or more traffic databases include: a database containing for a number of locations at least one of a number of vehicles or pedestrians that has passed that location during a predefined time period, an average speed of at least one of the vehicles or pedestrians at that location, and a ground surface state; a database based on traffic information from users of navigation system; a database with data retrieved via toll stations; a database with data derived from mobile communications (e.g. data based on cell phone localization); or a database with data based on RDS-TMC (Radio Data System-Traffic Message Channel) traffic messages.

12. A computer program comprising computer-executable instructions to perform the method, when the program is run on a computer, of claim 1.

13. A control system for a luminaire network comprising a plurality of luminaires, each luminaire of said plurality of luminaires being configured to operate in accordance with at least one profile which defines one or more settings of the luminaire in function of time, said control system being configured for:
  retrieving traffic data from at least one traffic database;
  retrieving weather data;
  predicting for each luminaire the motion related conditions for a future period of time based on the retrieved traffic data and the retrieved weather data; and
  based on the predicted motion related conditions, determining for each luminaire of said plurality of luminaires:
    whether the at least one profile needs to be changed for said future period; or
    at least one profile to be used for said future period or at least one value representative for at least one profile to be used for said future period,
  wherein the control system is further configured for obtaining at least one reliability value indicating the reliability of the retrieved traffic data, wherein at least one of the step of predicting or the step of determining is based on the at least one reliability value, and, preferably, wherein the at least one reliability value is based on a number of at least one of vehicles or pedestrians circulating in the vicinity of the luminaire.

14. The control system of claim 13, wherein the predicting, the determining, and at least one of the retrieving of traffic data and the retrieving of weather data are performed multiple times for multiple consecutive future periods, wherein preferably said steps are performed periodically.

15. The control system of claim 13, wherein the control system is configured to tag a luminaire of the plurality of luminaires with one or more infrastructure tags representative for one or more infrastructure features or infrastructure uses, and to perform the determining based on the one or more infrastructure tags.

16. The control system of claim 13, wherein the step of retrieving traffic data comprises a step of retrieving historical first traffic data for a first period of time and retrieving second traffic data for a current moment in time or for a second period which is shorter and more recent than the first period of time, wherein the second traffic data is obtained more regularly than the first traffic data, and wherein the step of predicting motion related conditions for a future period of time is based on the first and the second traffic data and on the weather data.

17. The control system of claim 13, further configured to obtain historical traffic and/or weather data covering a first period of time, wherein the step of retrieving the weather data and/or the step of retrieving the traffic data is repeated periodically every second period of time, said first period of time being longer than said second period of time, wherein the control system is configured to determine at least one first operating profile based on at least one of the historical traffic or historical weather data, and, wherein, based on the predicted motion related conditions, it is determined for each luminaire:
  whether the at least one first profile needs to be changed for said future period; or
  at least one second profile to be used for said future period or at least one value representative for at least one second profile to be used for said future period.

18. A method of performing management in a luminaire network comprising a plurality of luminaires and a control system, each luminaire of said plurality of luminaires being configured to operate in accordance with at least one profile which defines one or more settings of the luminaire in function of time, wherein a luminaire of the plurality of luminaires is tagged with one or more infrastructure tags representative for one or more infrastructure features or infrastructure uses, said method comprising performing by said control system the steps of:
  at least one of retrieving traffic data from at least one traffic database, preferably at least one of vehicle or pedestrian traffic data, or retrieving weather data;
  predicting for each luminaire motion related conditions for a future period of time based on the retrieved traffic data and/or the retrieved weather data, preferably motion related conditions influencing the motion behavior of at least one of vehicles or pedestrians circulating in the vicinity of the luminaire; and
  based on the predicted motion related conditions and the one or more infrastructure tags, determining for each luminaire of said plurality of luminaires:
    whether the at least one profile needs to be changed for said future period; or
    at least one profile to be used for said future period or at least one value representative for at least one profile to be used for said future period.

* * * * *